March 8, 1949.  J. L. JENSEN  2,463,973
HAMMER WEDGE
Filed Nov. 19, 1945
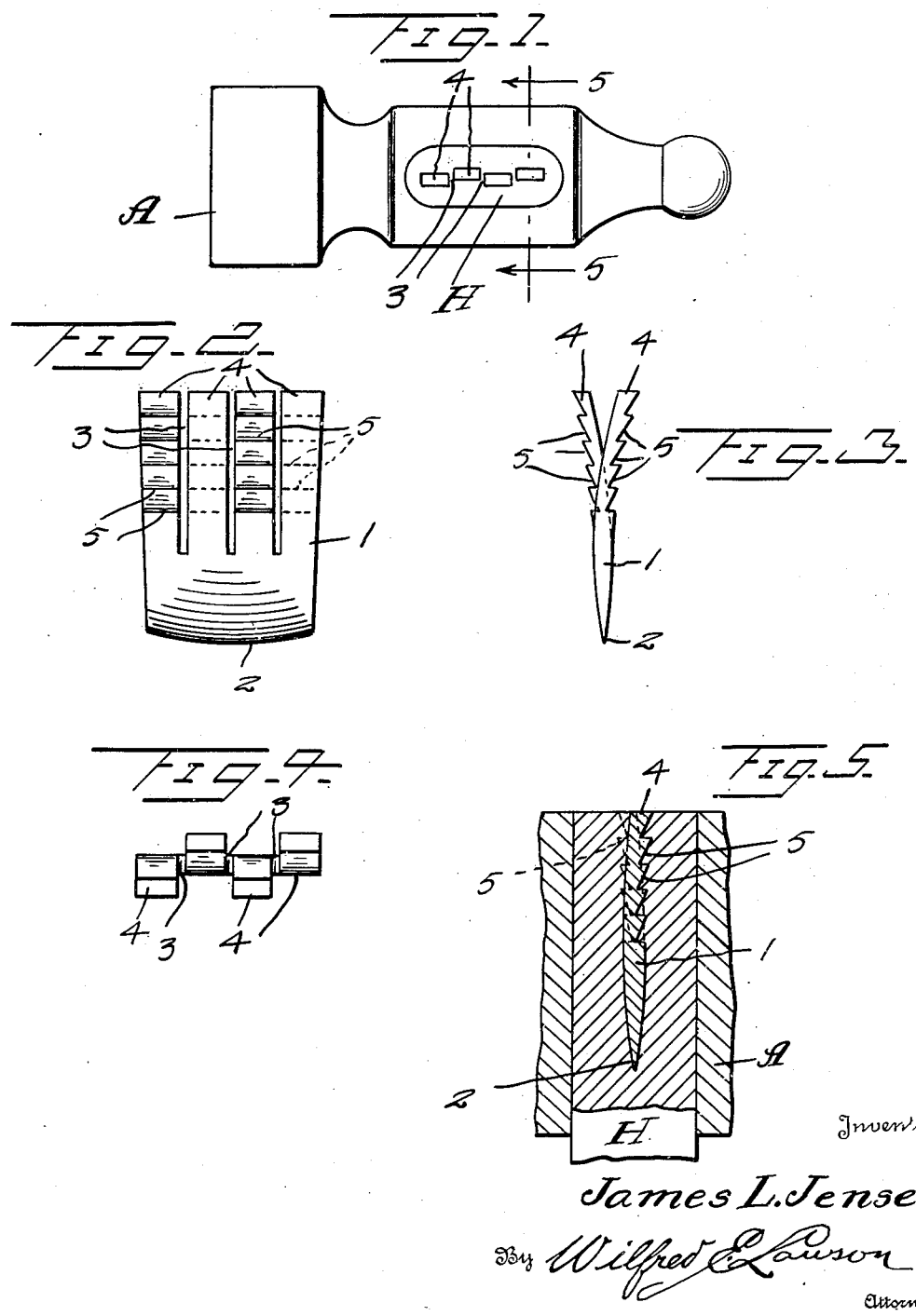
Inventor
James L. Jensen
By Wilfred E. Lawson
Attorney Patented Mar. 8, 1949

2,463,973

UNITED STATES PATENT OFFICE 2,463,973

HAMMER WEDGE

James L. Jensen, Cowley, Wyo.

Application November 19, 1945, Serial No. 629,457

1 Claim. (Cl. 306—33)

This invention relates to handle wedges and has relation more particularly to a wedge for use with the handle of a hammer, hatchet, ax, or the like.

A particular object of the invention is to provide a wedge formed to provide separated portions at the thick or top part thereof adapted to be disposed alternately beyond opposite sides of the wedge with the outer faces thereof provided with serrations or the like to assure effective holding engagement with the wood of the handle in which the wedge is inserted.

The invention also has for an object to provide a wedge having its top or thick part separated to provide portions extending beyond opposite sides of the wedge for effective engagement with the handle into which the wedge has been inserted, and wherein said separated portions possess sufficient inherent resiliency to compensate for the loosening of the handle within the head of the tool.

The invention consists in the details of construction and in the combination and arrangement of the several parts of my wedge whereby certain important advantages are attained, as will be hereinafter more fully set forth.

In order that my invention may be better understood, I will now proceed to describe the same with reference to the accompanying drawings, wherein:

Figure 1 is a view in end elevation of a tool showing applied thereto a wedge constructed in accordance with an embodiment of the invention.

Figure 2 is a view in side elevation of the wedge as herein embodied, unapplied.

Figure 3 is a view in edge elevation of the device as illustrated in Figure 2.

Figure 4 is a view in top plan of the wedge as illustrated in Figures 2 and 3.

Figure 5 is a sectional view taken substantially on the line 5—5 of Figure 1.

As illustrated in the accompanying drawings, the wedge comprising a body 1, of desired material and dimensions and which has its opposite side faces converging on a desured angle to provide a sharpened entering edge 2. The top or thickened portion of the body 1, is split as at 3 along substantially parallel lines equidistantly spaced transversely across the body 1, whereby is provided a plurality of separated portions or arms 4, preferably four in number.

The portions or arms 4, are alternately sprung outwardly in opposite directions beyond the converging faces of the body 1, and which portions possess a certain degree of inherent resilience which normally maintains the outer positions but permits the portions or arms 4 to readily flex inwardly as the wedge is driven into an end portion of a handle H, operatively engaged within the head A of an ax, hammer, or the like.

The outer faces of the portions of arms 4, are notched to provide the ratchet like teeth or barbs 5, the low points of which being inwardly directed to assure effective engagement with the wood of the handle H into which the wedge may be driven.

In practice, the wedge is driven into the handle H, in the usual manner, resulting in the resilient portions or arms 4, being forced inwardly toward the center of the wedge, as illustrated in Figure 2, of the drawings. As the handle H tends to loosen within the tool head A, the action of the alternately disposed portions or arms 4, will firmly hold the handle H within the head A.

From the foregoing description it is thought to be obvious that a wedge constructed in accordance with my invention is particularly well adapted for use by reason of the convenience and facility with which it may be assembled and operated.

I claim:

As a new article of manufacture, a wedge for a tool handle comprising a relatively wide body having converging side faces to form a bottom entering edge, said entering edge being sharp and unbroken throughout the width of the body and longitudinally curved the body having a plurality of spaced parallel slots formed transversely of and from the top edge only and extending through a major portion of the length of the body toward the said entering edge, the slots dividing the upper part of the body into a number of arms, said arms being resilient and extending alternately in opposite directions beyond the converging faces of the body, the outer faces of the arms having transverse teeth.

JAMES L. JENSEN.

REFERENCES CITED

The following references are of record in the file of this patent:

UNITED STATES PATENTS

| Number | Name | Date |
| --- | --- | --- |
| 954,669 | Clarke | Apr. 12, 1910 |
| 1,063,460 | McDonald | June 3, 1913 |
| 1,203,025 | McClain | Oct. 31, 1916 |
| 1,261,834 | Manning | Apr. 9, 1918 |
| 1,489,612 | Schade | Apr. 8, 1924 |
| 2,117,229 | Sugg | May 10, 1938 |

FOREIGN PATENTS

| Number | Country | Date |
| --- | --- | --- |
| 13,073 | Norway | Jan. 5, 1904 |
| 114 | Great Britain | Jan. 2, 1913 |
| 177,685 | Great Britain | Apr. 6, 1922 |
| 246,704 | Great Britain | Feb. 4, 1926 |
| 99,927 | Sweden | Sept. 24, 1940 |